United States Patent Office 3,547,992
Patented Dec. 15, 1970

3,547,992
COF-SUBSTITUTED-N-TRIFLUOROMETHYL-PHENYLSULFENAMIDES
Erich Klauke, Cologne, and Engelbert Kuhle, Bergisch-Gladbach, Germany, assignors to Farbenfabriken Bayer Aktiengesellschaft, Leverkusen, Germany, a corporation of Germany
No Drawing. Filed Mar. 22, 1967, Ser. No. 624,981
Claims priority, application Germany, May 27, 1966, F 49,313
Int. Cl. C07c 101/48, 63/12
U.S. Cl. 260—544                                    7 Claims

ABSTRACT OF THE DISCLOSURE

COF - substituted - N - trifluoromethyl-phenylsulfenamides are obtained by the reaction of fluorocarbonyl-N-trifluoromethyl anilines with sulphenic acid halides in the presence of a tertiary organic base.

BACKGROUND OF THE INVENTION

Field of the invention

The invention relates to the production of COF-substituted-N-trifluoromethyl-phenylsulfenamides by reacting fluorocarbonyl-N-trifluoromethyl-anilines with a sulphenic acid halide in the presence of a tertiary organic base.

Description of the prior art

As shown by our earlier disclosure N-trifluoromethyl-arylamines can be reacted with sulphenic acid halides in the presence of tertiary nitrogen bases as acid acceptors to form N-trifluoromethylated sulphenamides (German patent specification 1,161,262).

SUMMARY OF THE INVENTION

The invention lies in a process for the production of novel N-trifluoromethylated sulphenamides by reacting fluoro carbonyl-N-tri-fluoromethylanilines of the formula

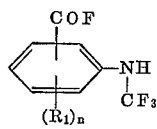

in which:

$n$ is an integer of from 1 to 4 and
$R_1$ represents a hydrogen or halogen atom or a nitro, alkyl, alkoxy or trifluoromethyl group in the presence of a tertiary organic base as acid acceptor, with a sulphenic acid halide of the formula $$R_2-SX$$

in which:
  $R_2$ represents an alkyl radical which may be substituted with a halogen atom, an aryl radical which may be substituted with halogen atoms or alkyl or nitro groups and $R_2$ further represents a chlorine atom or a group —SCl, and
  X represents a chlorine or bromine atom.

DETAILED DESCRIPTION OF THE INVENTION

When $R_1$ is halogen this is preferably fluorine, chlorine, or bromine, and when it is an alkoxy- or alkyl radical these are preferably lower aliphatic radicals having 1 to 4 carbon atoms.

The alkyl radical $R_2$ which may be substituted with up to 3 halogen atoms, which may be same or different, (preferably fluorine or chlorine) preferably have 1 to 4 carbon atoms, and the optionally substituted (one substituent up to complete substitution) aryl radical (preferably phenyl or naphthyl) preferably contains as its halogen atom substitutent fluorine, chlorine or bromine and as its alkyl group substitutent one which has 1 to 4 carbon atoms.

The fluorocarbonyl-N-trifluoromethylanilines used as starting compounds may be obtained e.g. in accordance with German patent specification 1,170,414. The following are examples of starting compounds used for the process:

3- or 4-fluorocarbonyl-N-trifluoromethylaniline,
2-fluorocarbonyl-5-chloro-N-trifluoromethylaniline;
3-fluorocarbonyl-5-nitro-N-trifluoromethyl aniline;
3-fluorocarbonyl-6-chloro-N-trifluoromethylaniline; and
3-nitro-4-fluorocarbonyl-N-trifluoromethylaniline.

Sulphenic acid halides used for the process are also known. In addition to $SCl_2$ and $S_2Cl_2$, the following compounds may be mentioned as examples: Methylsulphene chloride, chloromethane sulphene chloride, butylsulphene chloride, perchloromethylmercaptan, fluorodichloromethanesulphene chloride, phenylsulphenechloride, phenylsulphene-bromide, 4-chloro- or -bromo- or -fluoro-phenylsulphenechloride, 2,4-dichlorophenylsulphene chloride, pentachlorophenylsulphene chloride, 2 - chloro-4-nitrophenylsulphene chloride, 2- or 4 - nitrophenyl sulphene chloride, 2-, 3- or 4-methylphenylsulphene chloride or 2-chloro-1-naphthyl-sulphene chloride.

Apart from these specifically named compounds, the process according to the invention may also be carried out with sulphenic acid chlorides within the definition given above, such as those known e.g. from the following publications: Berichte der Deutschen Chemischen Gesellschaft, e.g. 58, pps. 409–416 (1925), and 84, pps. 911–916 (1961); Chemical Reviews 39, pp. 269–332 (1946).

The process according to the invention is explained below by way of example with reference to the reaction of 3-fluorocarbonyl-N-trifluoromethylaniline with fluoro-dichloromethane sulphene chloride:

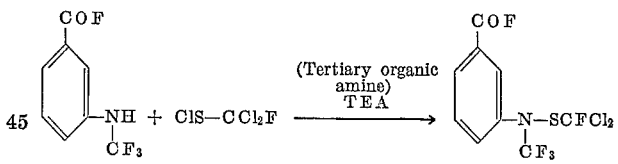

Generally, about the equimolar quantity of sulphenic acid halide is used per mol of arylamine. Accordingly, only about ½ mol of $SCl_2$ or $S_2Cl_2$ is used in the reaction per mol of arylamine. The tertiary organic amine used as acid acceptor is accordingly used in at least equimolar quantity so that there is at least one mol available per mol of hydrogen halide liberated in the reaction. The acid acceptor may also be used in an excess of up to about 30%.

Examples of suitable tertiary organic amines are triethylamine, pyridine or pyridines substituted by lower alkyl radicals, quinoline and dimethylbenzylamine.

The process according to the invention is carried out in the temperature range of about 0 to 50° C., preferably 20 to 40° C., advantageously in the presence of an inert organic solvent such as methylene chloride, chloroform, benzene, chlorobenzene or dioxane. The products are worked up in the usual manner.

It must be regarded as distinctly surprising that the process according to the invention leads in a smooth reaction to high yields of the novel compounds in spite of the presence of a COF group, since, as is well known, N-trifluoromethyl sulphenamides are easily decomposed at the N—S-bond by acylating agents (see Journal of Organic Chemistry 26, 3451 (1961)).

Further, it is surprising that the new compounds are extremely heat stable and can therefore be distilled without decompostion and without side reactions in spite of the presence of the fluorocarbonyl group. The new sulphenic acid amides can be used as plant protective agents with insecticidal and fungicidal action and as intermediate products for further reactions.

The fungicidal activity is demonstrated by applying the following new sulphenic acid amides:

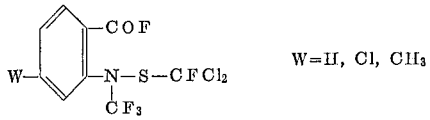   W=H, Cl, CH₃

Each of these compounds is applied in a concentration of 50 p.p.m. (dissolved in acetone), and the growth of the following fungi is completely inhibited (agar plate test):

| Fungus: | Plant |
|---|---|
| *Piricularia oryzae* | Rice. |
| *Cercospora musae* | Banana. |
| *Cercospora personata* | Peanut. |

Also the other compounds obtainable according to the described process can be used for the same purposes and show comparable activity.

EXAMPLE 1

55 g. triethylamine are added dropwise at room temperature to a solution of 103.5 g. 3-fluorocarbonyl-N-trifluoromethyl aniline and 85 g. fluorodichloromethane sulphene chloride in 200 ml. benzene, and the reaction temperature is allowed to rise to 40° C. When the exothermic reaction has subsided, the reaction mixture is stirred for about another 20 minutes, triethylamine hydrochloride is removed by suction filtration and the solution in benzene is concentrated by evaporation in vacuo. By subsequent distillation, 136 g. of N-trifluoromethylated sulphenamide of the formula

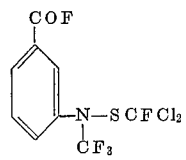

B.P. 118 to 125° C./11 mm. Hg
is obtained.

The following compounds are obtained in an analogous manner:

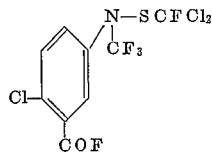

B.P. 145–150° C./20 mm. Hg

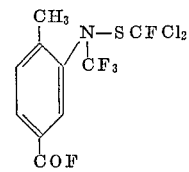

B.P. 140–145° C./15 mm. Hg

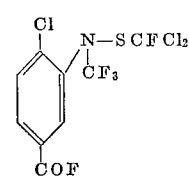

B.P. 142–147° C./13 mm. Hg

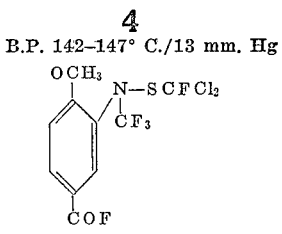

B.P. 160–167° C./13 mm. Hg

EXAMPLE 2

In a manner analogous to Example 1, 108 g. of the N-trifluoromethylated sulphenamide of the formula

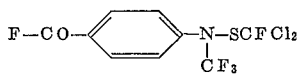

of B.P. 123–128° C./11 mm. Hg are obtained from 98 g. 4-fluorocarbonyl-N-trifluoromethylaniline and 80 g. fluorodichloromethanesulphenic acid chloride.

The following compounds are obtained in an analogous manner:

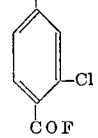

B.P. 155–158° C./27 mm. Hg

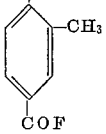

B.P. 138–145° C./17 mm. Hg

EXAMPLE 3

45 g. dimethylbenzylamine are added dropwise to a solution of 69 g. 2-fluorocarbonyl-N-trifluoromethylaniline and 56.5 g. fluorodichloromethane sulphenic acid chloride in 250 ml. benzene in such a way that the internal temperature is maintained at 30° C. The mixture is then stirred for about 30 minutes, separated from the amine salt by suction filtration, and the filtrate is concentrated by distillation in vacuo. 77 g. of trifluoromethylated sulphenamide of the formula

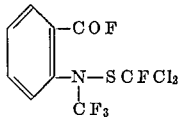

B.P. 132–136° C./13 mm. Hg; $n_D^{20}$: 1.4929 is obtained.

The following compounds are obtained in an analogous manner:

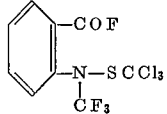

B.P. 148–151° C./13 mm. Hg

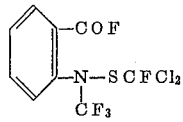

B.P. 142–148° C./17 mm. Hg

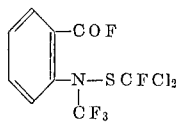

B.P. 116–124° C./13 mm. Hg

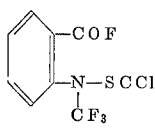

B.P. 157–162° C./11 mm. Hg 2-fluorocarbonyl-N-trifluoromethylaniline is obtained as follows:

750 ml. anhydrous hydrofluoric acid are placed in a stainless steel reaction vessel equipped with stirrer, reflux cooler and gas discharge tube. With the internal temperature at about 0° C., 500 g. 2-trichloromethylphenylisocyanate (B.P. 138° C./10 mm. Hg, $n_D^{20}$:1.5872) are run into the acid in the course of 3 hours, rapid evolution of HCl taking place. When the whole quantity has been added, the reaction mixture is slowly heated to a temperature of 20° C., and worked up by distillation after evolution of HCl has ceased.

274 g. (63% of the theory) of 2-fluorocarbonyl-N-trifluoromethylaniline of B.P. 70 to 72° C./16 mm. Hg, $n_D^{20}$:1.4705 are obtained.

We claim:

1. COF-substituted-N-trifluoro-methylated-phenyl-sulfenamides of the formula

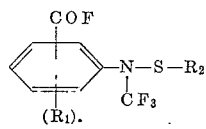

in which $R_1$ stands for hydrogen or a halogen atom selected from the group consisting of floro, chloro and bromo, alkyl- or alkoxy group having from 1 to 4 carbon atoms, a trifluoro methyl and a nitro group, $R_2$ stands for $CX_3$, wherein X is a halogen.

2. A COF-substituted-N-trifluoro-methylated-phenyl-sulfenamide, according to claim 1, wherein X constitutes at least one member selected from the group consisting of fluoro, chloro, and bromo.

3. A COF-substituted-N-trifluoromethylated-phenyl-sulfenamide according to claim 1 having the following formula:

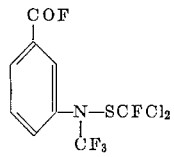

4. A COF-substituted-N-trifluoromethylated-phenyl-sulfenamide according to claim 1 having the following formula:

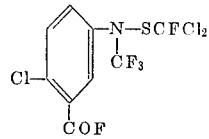

5. A COF-substituted-N-trifluoromethylated-phenyl-sulfenamide according to claim 1 having the following formula:

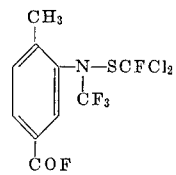

6. A COF-substituted-N-trifluoromethylated-phenyl-sulfenamide according to claim 1 having the following formula:

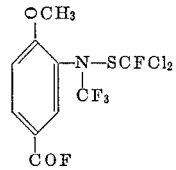

7. A COF-substituted-N-trifluoromethylated-phenyl-sulfenamide according to claim 1 having the following formula:

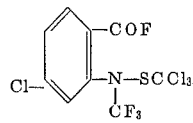

References Cited

UNITED STATES PATENTS 3,236,842    2/1966    Klauke et al. _____ 260—247.1

LORRAINE WEINBERGER, Primary Examiner

E. J. GLEIMAN, Assistant Examiner

U.S. Cl. X.R.

424—317

UNITED STATES PATENT OFFICE
CERTIFICATE OF CORRECTION

Patent No. 3,547,992　　　　　　　　Dated December 15, 1970

Inventor(s) Erich Klauke et al.

It is certified that error appears in the above-identified patent and that said Letters Patent are hereby corrected as shown below:

Col. 5, first formula　　(Spec. p. 7, 4th formula)

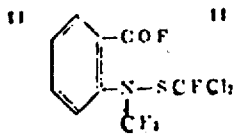　　should be --　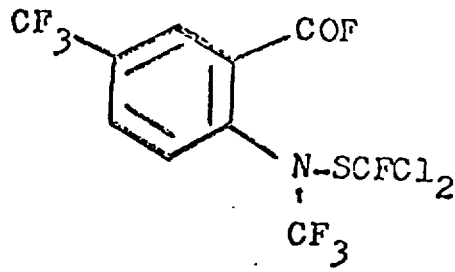

Col. 5, second formula　　(Spec. p. 7, 5th formula)

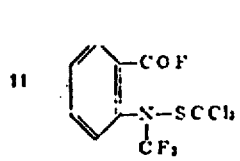　"　should be --　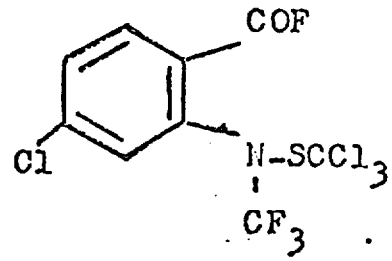　--

Signed and sealed this 27th day of April 1971.

(SEAL)
Attest:

EDWARD M. FLETCHER, JR.　　　　　　　WILLIAM E. SCHUYLER,
Attesting Officer　　　　　　　　　　Commissioner of Patel